United States Patent [19]
Eigner

[11] Patent Number: 6,065,224
[45] Date of Patent: May 23, 2000

[54] DEVICE AND PROCESS FOR THE AEROBIC TREATMENT OF ORGANIC SUBSTANCES

[75] Inventor: Erich Eigner, Lödersdorf, Austria

[73] Assignee: Interlicense Den Haag B.V., Germany

[21] Appl. No.: 09/101,549

[22] PCT Filed: Jan. 11, 1996

[86] PCT No.: PCT/EP96/00110

§ 371 Date: Jul. 10, 1998

§ 102(e) Date: Jul. 10, 1998

[87] PCT Pub. No.: WO97/25295

PCT Pub. Date: Jul. 17, 1997

[51] Int. Cl.[7] .................................................. F26B 5/08
[52] U.S. Cl. .............................. 34/322; 34/369; 34/371; 34/135; 34/147
[58] Field of Search .............................. 34/322, 363, 366, 34/369, 371, 401, 135, 137, 147, 164, 174; 210/631, 757, 764, 806; 208/314, 337; 366/76.1, 179, 219

[56] References Cited

U.S. PATENT DOCUMENTS

| | | | |
|---|---|---|---|
| 2,535,627 | 12/1950 | Earp-Thomas | 34/174 |
| 3,731,393 | 5/1973 | Okada et al. | 34/369 |
| 4,089,119 | 5/1978 | Heinze | 34/369 |
| 4,432,148 | 2/1984 | Darbonne et al. | 34/322 |
| 4,545,959 | 10/1985 | Schilling et al. | 34/369 |
| 4,772,193 | 9/1988 | Glatt | 34/369 |
| 4,909,825 | 3/1990 | Eingner | 71/9 |
| 5,463,819 | 11/1995 | Komori | 34/135 |
| 5,611,150 | 3/1997 | Yore, Jr. | 34/147 |

*Primary Examiner*—Stephen Gravini

[57] ABSTRACT

A device for the aerobic treatment, conditioning and/or drying of moist, substantially solid or paste-like, at least partly organic material, has a vessel containing paired, Venetian-blind-like walls, with adjustable blades, forming at least one reaction chamber, at least one air inlet chamber and at least one air discharge chamber, and containing supports which are in spatially staggered array inside the reaction chamber in such a way that they provide the best possible pressure relief for the filling. The invention also relates to a process using said device.

48 Claims, 3 Drawing Sheets

DEVICE AND PROCESS FOR THE AEROBIC TREATMENT OF ORGANIC SUBSTANCES

BACKGROUND OF THE INVENTION

The invention relates to a device for the aerobic treatment, conditioning and/or drying of moist, preferably at least partly organic material essentially of a solid or paste-like nature, utilizing a specific reactor geometry and special inserts. The device is suitable in particular for the microbiological treatment, conditioning and/or hygienization of organic residues and other organic wastes, in particular of industrial and communal sewage sludges, and of wastes from agricultural production, large-scale animal keeping, horticulture and industrial production of food and of luxury consumables, for the purpose of long-term stabilization of the residues and/or for the production of organic and organo-mineral fertilizers, culture substrates and/or soil conditioners.

PRIOR ART

The most closely related prior art (AT 382 862 B) describes a process and a device for drying layers' droppings or similar paste-like substance. There, in a microbiological phase, shaped, stable supports are populated with selective microorganisms, the paste-like substances to be treated are compressed beforehand into strand-like pellets and suitable climatic conditions for the activity of microorganisms are created by means of conditioned air. The resulting heat and moisture are removed by the air stream. After the end of the microbiological phase, the remaining material is dried in a drying phase to the desired dryness by means of air flowing through. The device used for this purpose has a closed cylindrical vessel which contains in the interior two coaxially arranged, air-permeable cylinders which are made of perforated sheet metal, can be vibrated vertically and contains [sic], between the perforated metal sheets, supports for the selected microorganisms. The air inlet and air outlet pipes and the fans are mounted in such a way as to force a centripetal air flow from the inner wall of the vessel through the perforated metal sheets to the centre of the vessel, from where it is removed from the vessel via an air outlet pipe.

By means of this process, it is possible by using microorganisms which are concentrated on supports to dry granulated, briquette-like or shredded, paste-like substances with the lowest possible energy. Finally, it is intended, for example, to process layers' droppings from large-scale animal keeping in such a way that the dried product in granular form emerges from the drying process and can be stored without problems and also sold in supermarkets as biological fertilizer. In addition, a small part of the organic as well as inorganic substances present are converted by the microorganisms into $CO_2$, heat and residues in this process, which is an advantageous effect in that these organic substances are frequently undesired in the end product since they have an unpleasant smell and limit the stability of the dried end product.

Disadvantages of this plant include the fact that, as a result of the reactor geometry, a substantially larger inlet area into the reaction chamber than outlet area out of the reaction chamber is available to the air flowing through always only in one direction, namely centripetally. As a result of this, in particular in the case of relatively large layer thicknesses of the reaction chamber, for example more than 100 cm, the air velocity at the outlet orifices of the inner perforated sheet metal cylinder is so high that—especially in the drying phase—it can also transport relatively small particles which are then deposited outside the reaction chamber in the bioreactor and must be removed from there by a tedious procedure since they would otherwise cause an undesired odor.

The problem of the undesired emergence of the content from the reaction chamber also occurs in the course of the filling process, where frequently particles are thrown or forced through the holes of the perforated sheet metal cylinder into the air chamber.

A further disadvantage of the known plant is that, especially in the region of the base of the reaction chamber, where the freshly introduced organic material is compressed to the greatest extent, the exclusively horizontal air flow may no longer be sufficient for sufficiently hygienizing and/or drying the material present there, which may result not only in poorer quality but also in process engineering difficulties (e.g. more difficult discharge, odor annoyance).

Another major disadvantage is that the content in the edge zones of the reaction chamber, i.e. in the vicinity of the perforated metal sheets, is not supported and therefore experiences no pressure relief so that the material is compressed to a greater extent there and offers higher resistance to the air flowing through, which has a disadvantageous effect both on the treatment process as such and on the required fan power and hence on the energy consumption.

In comparison, it was the object of the present invention, utilizing the essentially identical microbiological and physical effects, to provide an apparatus which, owing to a substantially improved bioreactor geometry and in particular in interaction with a modified mode of operation, impressively overcomes the above-mentioned disadvantages of the most closely related prior art.

SUMMARY OF THE INVENTION

This object is achieved, according to the present invention, by a device in which the interior of the round or polygonal reactor vessel is divided not by perforated sheet metal cylinders but by paired air-permeable walls having a Venetian-blind-like construction. These pairs of walls extend essentially over the total height of the bioreactor vessel and are arranged in such a way that the facing sides, i.e. the insides, of each pair form a reaction chamber in between, while those sides of such a pair which face away from one another, i.e. the outside, form air chambers. The blades are attached and preferably displaceably mounted with predetermined blade angles, distances, lengths and/or widths on the support structure so that the angles of the blades can be changed similarly to conventional Venetian blinds. Depending on the bioreactor type, these Venetian-blind-like walls are linear, curved or annular and arranged in pairs relative to one another in such a way that they assume an essentially constant distance from one another over their total length, which is achieved by at least an approximately parallel or concentric arrangement.

DETAILED DESCRIPTION OF THE INVENTION

Figure 1:
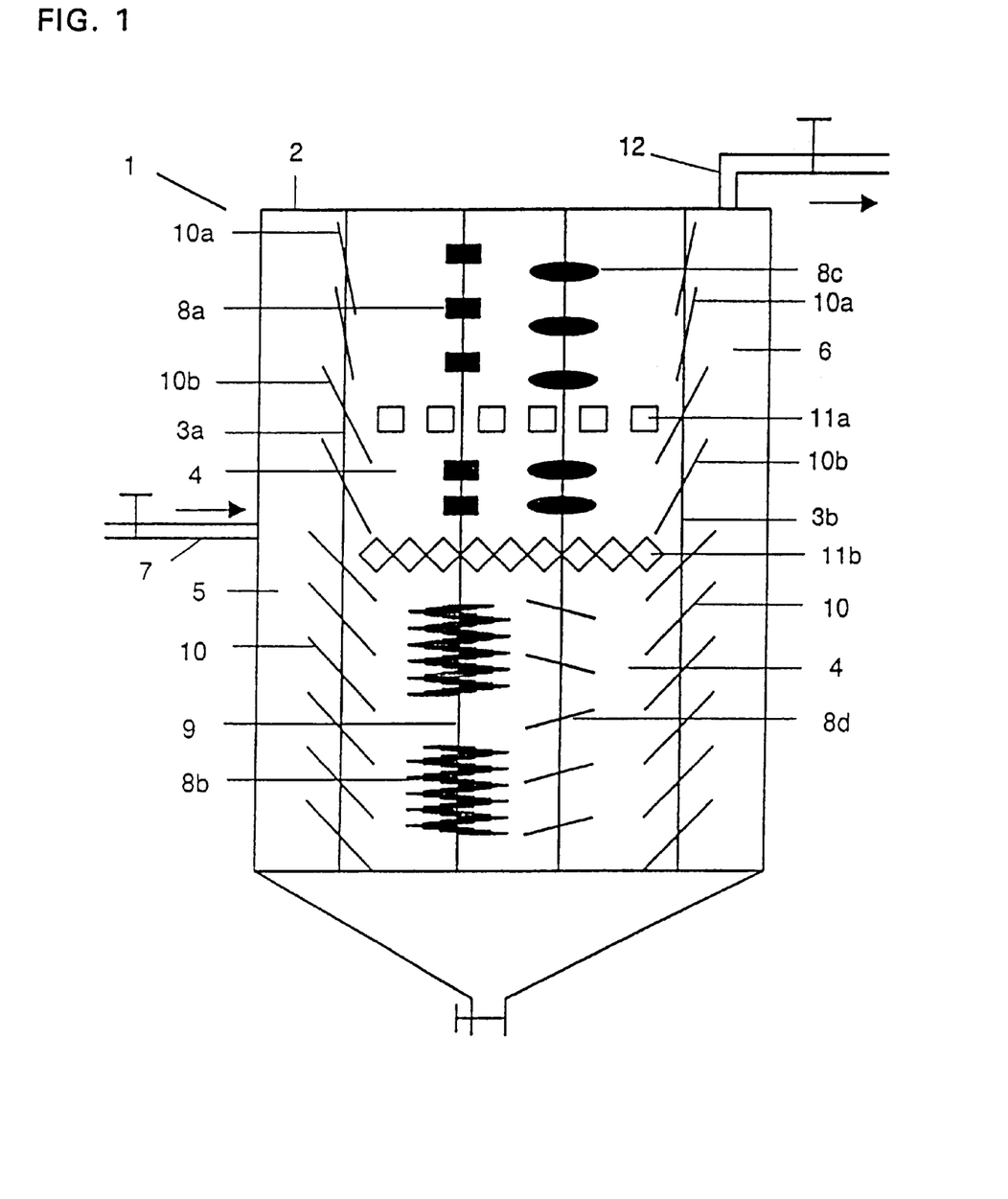
FIG. 1 shows in principle a two-dimensional frontal view of the device according to the invention, having a pair of parallel Venetian-blind-like walls, having supports, carriers and horizontal elements.

In the simplest case, the bioreactor 1 consists of a vessel 2 having a tetragonal horizontal cross-section and a single pair of internal, linear Venetian-blind-like walls 3a, 3b. These Venetian-blind-like walls are preferably arranged plane-parallel to one another in order to ensure a uniform layer thickness of the reaction chamber 4 lying in between. With their outsides, they divide the interior of the vessel into two air zones which communicate with one another only via the reaction chamber. One air zone is air inlet region 5 to which fresh air, recycled exhaust air or other secondary air is fed via at least one air inlet pipe 7, while the other air zone is the air outlet region 6 in which the air is collected after flowing through the reaction chamber 4 and is removed from the vessel via at least one air outlet pipe 12.

The device according to the invention additionally contains supports 8a, 8b, 8c, 8d and optionally carriers 9 which are arranged inside the reaction chamber. The supports serve the purpose of providing the best possible pressure distribution in the content, so that an average maximum pressure which is lower than the corresponding pressure without these supports acts even on the particles of the organic material introduced and present in the base region of the reaction chamber 4, the weight of content being the same. This effect of pressure reduction results in a looser bed of the content in the reaction chamber 4 and is promoted by virtue of the fact that supports 8a, 8b, 8c, 8d are arranged in a spatially staggered way both vertically and horizontally, with the result that they furthermore prevent the formation of undesired, continuous horizontal layers inside the reaction chamber 4. Their horizontal, diagonal and vertical distance from one another is moreover such that, depending on their size, i.e. in particular their horizontal dimension and an economically reasonable number of such elements, the distances to the adjacent supports are as far as possible a minimum, while the mutual support of the weight of the introduced particles of the organic material reaches an optimum—inter alia by means of bridge effects.

The relatively loose bed of the content achieved therewith is accessible to an adequate and substantially uniform air supply in the total reaction chamber 4. The use of suitable supports 8a, 8b, 8c, 8d and optionally carriers 9 furthermore prevents the formation of undesired zones of relatively low air resistance or poor air flow and hence a reduction in the performance of the reactor. Such undesired effects might occur, for example, in the case of supports which enclose air chambers which are not filled or not sufficiently filled by the content.

With regard to an optimal pressure distribution and pressure reduction, it has proven advantageous not to introduce the supports 8a, 8b, 8c, 8d loosely into the reaction chamber but to fix them in a substantially localized manner in the horizontal and vertical direction. In a simple case, the spatial arrangement of the supports can be achieved, for example, by providing them with a hole and—similarly to the beads of a necklace—threading them onto a carrier 9, for example a rope or a rod. Preferably, the supports which are threaded on a rope or a rod are kept separated from one another in the vertical direction by spacers, for example hollow cylinders of suitable dimensioning which are threaded on in between. The vertical distance between the supports need not be constant over the total length of the carrier but is advantageously smaller in the vicinity of the base than in the top region of the reaction chamber. As a result of the shorter spacing and consequently the larger number of supports in the lower zones in the vicinity of the base, the real pressure conditions are better taken into account and the pressure relief achieved is better than that in the case of a random even distribution of the supports throughout the reaction chamber.

However, it should be borne in mind that the spacers must be dimensioned so that on the one hand they produce no undesired cavities and on the other hand they are capable of bearing the weight of the supports and the pressure applied thereon. Moreover, they must of course withstand the chemical and thermal stresses occurring in the bioreactor.

For most applications, the supports 8a, 8b, 8c, 8d are arranged one on top of the other at vertical distances of about 10 to about 100 cm, and in the case of compact and heavy contents, at distances of not more than about 20 to about 50 cm. Their lateral spacing—measured as the lateral distance between the imaginary vertical axes of two adjacent, spatially staggered supports—is preferably about 20 to about 80 cm, in particular about 30 to about 50 cm, likewise depending on the filling density, the strength, the porosity and the specific gravity of the content and on the size of the supports. In the presence of vertical carriers with supports fixed thereon, this corresponds to the distance between two adjacent, vertically mounted carriers.

The size of the supports 8a, 8b, 8c, 8d which may reasonably be used under industrial conditions is measured mainly along their horizontal dimension, i.e. their largest width, which is between about 5 and about 35 cm, but preferably between about 10 and about 20 cm.

In a preferred embodiment, the carriers 9 are fixed on a stable suspension device, for example a grid, in the top of the vessel 2 and optionally additionally on a fixing element, for example likewise a grid, in the region of the base. Of course, the suspension device in the top and the fixing element in the region of the base are designed in such a way that they do not substantially hinder the filling and/or emptying process for material to be treated or to be subjected to a final treatment.

For economically very good utilization of the space in the device according to the invention, it has proven advantageous to install supports and optionally carriers only in a quantity such that they together occupy no more than about 0.5 to about 10%, but preferably only about 1 to about 6%, of the vessel body. The supports 8a, 8b, 8c, 8d consist essentially of symmetrically or asymmetrically shaped members which are suitable for exerting a loosening, supporting and pressure-distributing effect on the content. For example, tubes, cylinders, cones, disks, plates, spheres, spiral elements and similar three-dimensional members are suitable for this purpose.

It has proven to be very advantageous if the supports 8a, 8b, 8c, 8d and/or optionally the carriers are displaceably mounted at least to such an extent that—coupled with a vibrating device—they can be vibrated vertically and/or horizontally. This measure, too, causes the breaking of material bridges which have built up between adjacent supports and thus promotes the internal material transport from top to bottom and discharge of material from the reaction chamber.

In a particularly advantageous embodiment of the device according to the invention, at least a part of the supports 8*a*, 8*b*, 8*c*, 8*d* is in the form of vertically arranged spirals and/or screws 8*b*. The spirals have the geometry of spiral springs, i.e. they contain no internal axis and are either designed to be self-supporting or are stabilized in their pitch by, for example, two outer axes. However, the spirals may also be designed in such a way that their ribbon-like spiral paths are interrupted in segments, are transformed into a rigid axis and then assume the spiral shape again. The screw elements 8*b* are supports in the form of conveyor screws, which likewise are designed either with a continuous spiral path or with a spiral path interrupted in segments. The width of these ribbon-like spiral paths is in both cases between about 5 and about 35 cm, preferably between about 10 and about 20 cm. The total diameter of such screw and spiral elements is between 10 and about 90 cm with a pitch (=longitudinal distance between two identically oriented points along the spiral path after a 360° revolution) of the spiral path of about 10 to about 100 cm. The advantage of this type of supports 8*b* is in particular that—in addition to their supporting property—they effectively assist material transport within the reaction chamber 4 and in particular the discharge of material from the vessel 2, provided that they are rotatably mounted and are connected to a drive motor which rotates them about their longitudinal axis at the desired time. As a result of the rotation of the spirals and/or screws 8*b*—as in the case of the above-mentioned vibration—bridges present in the content which were formed between adjacent supports are broken and sliding of material into the lower regions of the reaction chamber 4 is thus assisted.

In another embodiment, at least a part of the support is in the form of Venetian-blind-like walls 8*d*, which preferably contain adjustable plates. They are preferably designed in such a way that they extend approximately over the total height, but at least over three quarters of the height of a reaction chamber 4. Advantageously, the blade angle of the blades can be adjusted in segments, for example in vertical segments of about 0.5 to about 1 m in height, both separately from one another and jointly. The number of such Venetian-blind-like walls 8*d* as supports depends on the size of the total device and on the layer thickness of the reaction chamber 4. In the case of small plants, a single Venetian-blind-like wall 8*d* may be sufficient, but two to about fifteen such Venetian-blind-like walls are generally present within the reaction chamber and may be arranged parallel or staggered relative to one another. As in the case of the spiral or screw-like supports 8*b*, here too it is possible to break material bridges by movement of the blades and thus to ensure uniform and/or accelerated further transport of the treated material within the reaction chamber 4 and/or improved discharge of the material from the vessel 2.

An important contribution toward supporting the content and distributing the pressure therein in the edge region of the reaction chamber is also made by the Venetian-blind-like walls 3*a*, 3*b*, whose blades 10, 10*a*, 10*b* are designed and fixed in such a way that their lower edges extend into the reaction chamber 4 while their upper edges point upward away from the reaction chamber into the air chambers 5 or 6. In the simplest and most economical embodiment, the blades 10, 10*a*, 10*b* are rigidly mounted at a desired blade angle, for example placed in a rack with grooves cut in at the correct angle, and welded on.

In the simplest case, the blades 10, 10*a*, 10*b* are in the form of linear, flat sheet metal strips having a thickness of about 0.2 to about 0.8 mm. Of course, in order to achieve a better load-bearing capacity and torsional rigidity of the blades, convex blade strips or blade strips pressed into special profile form can of course also be used. Also with respect to the material used, the present blade construction, as well as the entire reaction vessel, is by no means restricted to metal, in particular stainless steel, aluminum or galvanized iron sheet. Rather, it is also possible to use, for example, suitable plastics which withstand the chemical, thermal and mechanical stress, as well as wood.

In an extremely efficient embodiment, in particular in the case of large plants, the blade construction consists of Venetian-blind-like walls 3*a*, 3*b* having a plurality of segments, preferably three to ten, but at least two horizontal and preferably also vertical segments, which can be adjusted jointly and/or independently of one another with respect to the angle of the blades 10, 10*a*, 10*b*. In the horizontal direction, mainly the pressure load on individual blades is taken into account by a subdivision into two or more segments, in order to avoid the necessity of using long blades which might sag or even become permanently deformed. This might otherwise lead to, inter alia, a limited rotatability of the blade in the movable embodiment and, both in the case of the rotatable and in the case of the rigid blades, cause or at least promote undesired material discharge from the reaction chamber into the air chambers. However, it also permits the operator of such a device to specifically establish certain process conditions and process states in different regions of the reaction chamber 4.

Thus, for example, the vertical segments in cooperation with adjustable blades 10, 10*a*, 10*b* permit the reaction chamber 4 to be divided in a specific manner into vertical zones of different fermentation, hygienization and/or drying conditions. These advantages of division into zones having different ventilation adapted to the respective process condition by means of the angle of the blades 10, 10*a*, 10*b* are provided in particular by a semicontinuous mode of operation, i.e. operation with partial emptying and refilling taking place at desired intervals. However, it also has advantages for batchwise operation, where such a construction makes it possible substantially to seal off the top region of the reaction chamber 4, which may be free of introduced material after filling and settling of the material, in particular during the microbiological degradation process, by closing the blades 10*a* of the uppermost segment. This makes it possible to prevent the inlet air from preferably flowing through this part of the reaction chamber owing to the lower air resistance and adversely affecting or completely eliminating the reactor performance.

The blades 10, 10*a*, 10*b* are variable within wide limits with respect to their dimensions. In practice, however, they are about 5 to about 30 cm wide and about 0.2 to about 0.8 cm thick for most applications. They may be any desired length; in small plants, for example, they may only have a length of 0.5 m or less, whereas in large plants they may also have a length of 10 m or more. However, it is then necessary to support the blades once or repeatedly by load-bearing means over their length in order to prevent an undesired deformation of the blades by, for example, bending or buckling.

In particular, a blade width of about 12 to about 15 cm with a blade thickness of 0.5 cm has proven useful. The vertical distance between the blades arranged one on top the other, relative to points in the same position, for example from upper edge to upper edge, is about 5 to about 20 cm, a vertical distance of about 10 cm being particularly advantageous for design as well as processing engineering reasons, especially in conjunction with blades having a width of about 12 to about 15 cm. In the case of embodiments without additional grids or nets (see further below), in the orifices of the Venetian-blind-like walls, it is important that vertical blade spacing, blade width and blade angle are tailored to one another in such a way that, at a selected blade angle, the upper edge of each blade is at at least the same height as the lower edge of the next blade above, preferably even higher. In this way, a very high degree of material retention in the reaction chamber 4 with simultaneous optimal ventilatability is achieved.

For most operating states in which air flow is intended, blade angles of about 40 to about 70 degrees, measured from the horizontal, lead to the desired success. However, because of the particular mode of operation, it may be advantageous to choose the blade angle, within separately adjustable segments, outside these values in order, for example, intentionally to produce reduced or increased air flow in such segments. It is clear to a person skilled in the art that microorganisms have a different oxygen demand for the conversion of mixed substrates, depending on the biodegradability of the materials. This situation can be taken into account specifically in a relatively simple manner by means of a device according to the invention, having adjustable blades, without having to change the fan power or possibly having to use an additional, separate fan. Optionally, an equilibration valve for excess inlet air should be provided on the air inlet side in order to pass a constant air stream through those zones of the reaction chamber where the blades were not adjusted.

Grids or nets which cover the orifices between the blades 10, 10a, 10b, especially in the fixed embodiment, are in principle not necessary but impart an additional degree of safety so that, even in the case of a very shallow, i.e. wide open, blade angle, for example 35 degrees or less, safe material retention inside the reaction chamber 4 is ensured. Such grids or nets have a mesh size of about 0.2 to about 6 cm, preferably of about 0.5 to about 3 cm, and consist of metal or a suitable, mechanically strong plastic which is chemically resistant under the given conditions of use and withstands temperatures up to about 100° C. without damage and without a deterioration in its mechanical properties.

In a further embodiment, vertical segments are moreover formed by adjustable horizontal elements 11a, 11b, in particular those which are tubular and rotatable about their longitudinal axis and extend over the total, or approximately the total, length of the reaction chamber. These are preferably elements which have an elliptical, triangular or polygonal cross-section and are arranged in one or more horizontal planes so that they are essentially parallel to one another and, in at least one rotational position, divide the reaction chamber into two or more, preferably at least approximately closed segments one on top of the other. It is self-evident to a person skilled in the art that this effect can also be achieved by other embodiments of the horizontal elements, for example by horizontally arranged Venetian blind constructions or mutually displaceable slatted floors (gap width preferably at least 20 cm) and the like.

By means of such horizontal elements in the closed position 11b, for example, the content of a lower segment can be retained whereas an open connection can be produced between two previously separated segments by rotation of the horizontal elements of an upper plane into an open position 11a, with the result that, for example, content from an upper segment can pass into a segment underneath—optionally in a controlled and properly metered manner. This makes it possible, for example, to compensate the volume reduction on the settling of the material introduced and/or—if desired—to set up and/or to maintain zones of different microbiological activities, hygienization and/or drying.

It is therefore also possible, for example, for a lower section to be passing through a drying phase while microbiological degradation and hygienization is still taking place in the segments above. In conjunction with adjustable blades it is possible in this way to effect a carefully thought out mode of operation of the device according to the invention. For reasons relating to geometry, such tubular horizontal elements 11a, 11b are used in practice only in devices having linear Venetian-blind-like walls, i.e. having rectangular or square reaction chambers.

Depending on the type and characteristics of the content used, for example particulate, granular, fibrous, paste-like, compact, loose, etc., and on the method of filling, for example dense filling with granules of different particle sizes or mixed filling with paste-like material and loosening structural material, such as wood chips, chopped straw, bark chips and the like, the layer thickness (=width) of the reaction chamber 4 can be varied within relatively large ranges. In practice, layer thicknesses of about 50 to about 250 cm can be reasonably used, a layer thickness of about 60 to about 120 cm being preferable for paste-like content, in particular in the case of relatively large plants whereas layer thicknesses of up to 250 cm or more can be successfully used with very good economy of the process, for example for material of lower density and simultaneously high strength.

The lower limit of the layer thickness of the reaction chamber 4—regardless of the economy of the process—is also determined by the space required by the Venetian-blind-like walls and the inserts in the reaction chamber and by a required minimum distance between the Venetian-blind-like walls for the purpose of mechanical fillability of the reaction chamber 4 by conventional filling means.

While the device according to the invention together with its apparatuses can in principle be constructed in any desired size in most cases a vessel having Venetian-blind-like walls 3a, 3b of not more than about ten meters in height with a vessel width of about three to four meters is sufficient for a pair of Venetian-blind-like walls, or of about six to seven meters for two pairs. With the sewage sludges, organic residue quantities and/or other organic wastes from small and medium-size producers, even a vessel with only about three to about four meters in height is sufficient in many cases. In the case of vessels having reaction chambers less than one meter high, the procedure frequently falls below a cost-efficiency limit so that the marketing thereof encounters difficulties, which however changes nothing with respect to its basic operability.

For reasons relating to fluid mechanics, it has also proven advantageous to extend the outlet air chamber or—in the case of more than one outlet air chamber—the outlet air chambers in a funnel-like manner toward the outlet air pipe, which is achieved in the case of an embodiment having two reaction chambers and centrifugal air flow, i.e. directed from an inner air inlet chamber outward toward the two outlet air chambers, by vessel walls appropriately inclined outward. This prevents a possible backup of exhaust air and thus also adequately vents the base region of the reaction chamber. Otherwise, the outlet air chambers should be dimensioned so that a backup of exhaust air cannot occur with the air flow rates to be expected.

Figure 2A:
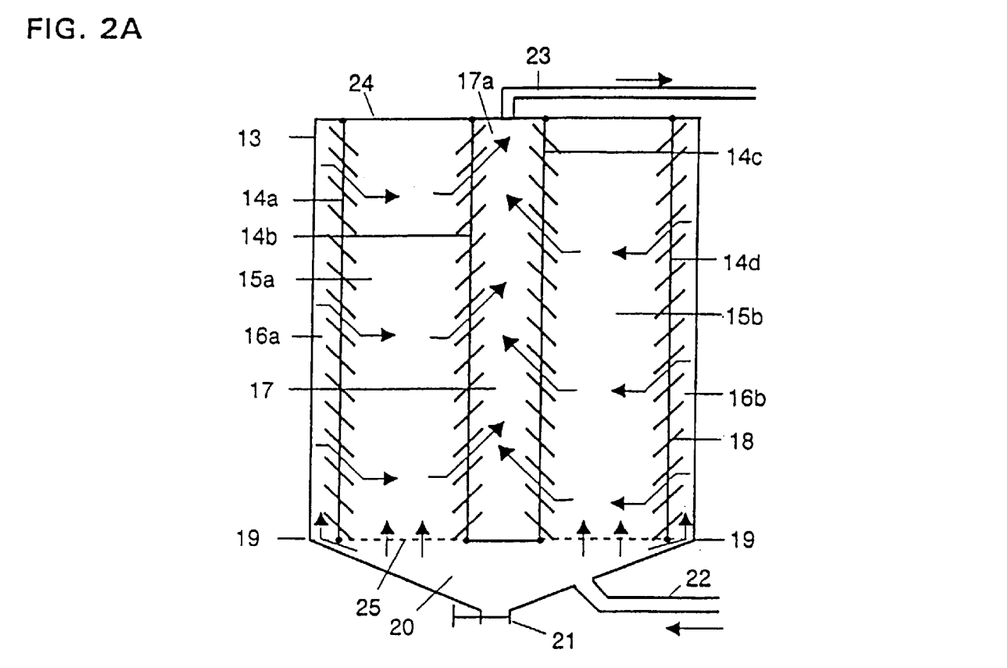
FIG. 2A shows in principle the preferred direction of air flow in a device having two reaction chambers and perforated vessel base; arrows indicate the direction of flow.
Figure 2B:
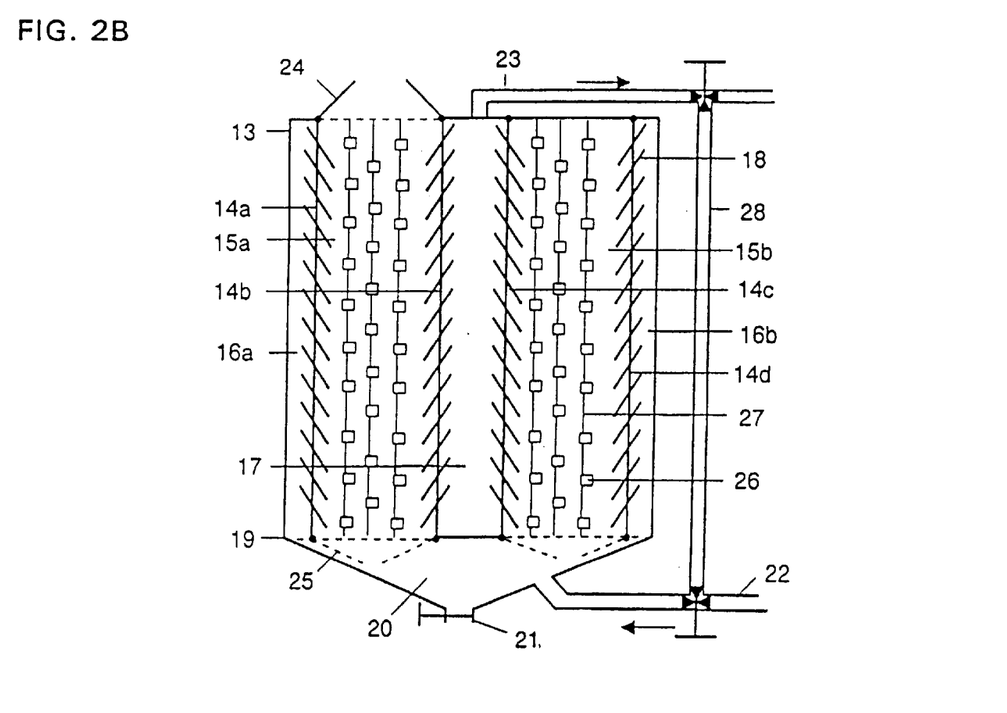
FIG. 2B shows in principle a two-dimensional frontal view of the device with filling and base flaps, supports and connecting pipe between air inlet and air outlet pipes.

In a preferred embodiment, the device according to the invention consists of a heat-insulated, rectangular or square bioreactor vessel 13 having two pairs of at least approximately plane-parallel Venetian-blind-like walls 14a, 14b, 14c, 14d, in particular those of the same size and geometry, i.e. having two reaction chambers 15a, 15b of essentially rectangular horizontal cross-section. In principle, however, embodiments having three or more, preferably an even number, of such reaction chambers 15a, 15b are likewise feasible, such plants however having certain disadvantages with respect to design and cost.

Figure 3:
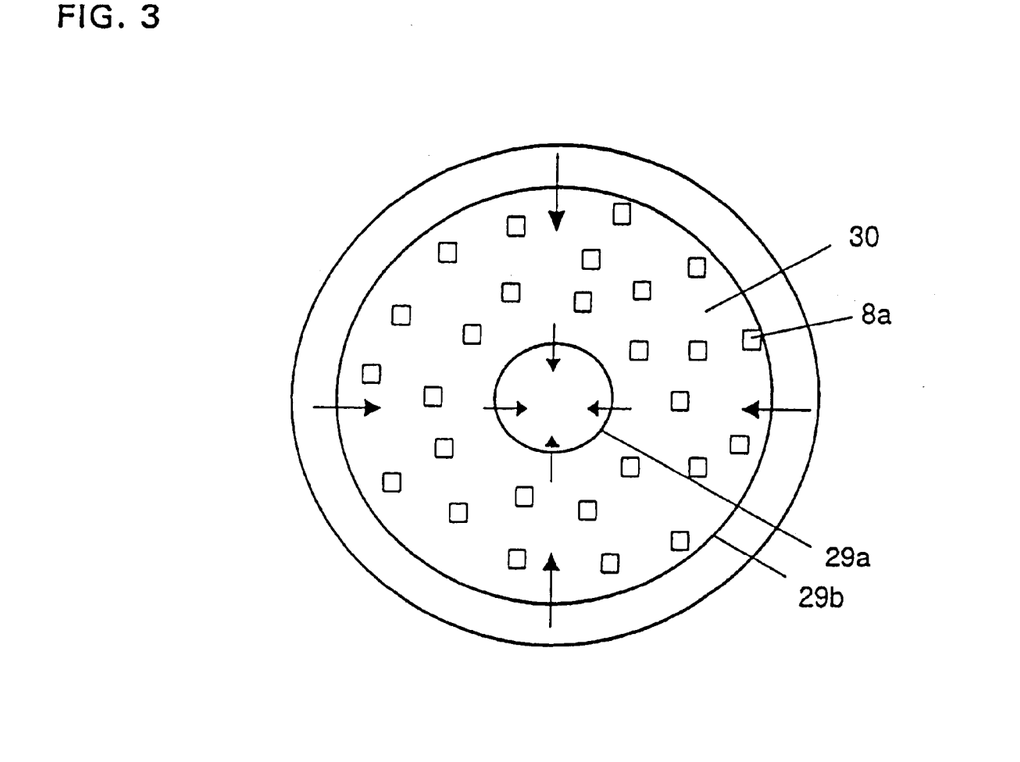
FIG. 3 shows in principle a horizontal cross-section of a round embodiment of the device with a pair of annular Venetian-blind-like walls arranged concentrically one inside the other and having supports; arrows indicate the preferred direction of flow of the air.
Figure 4:
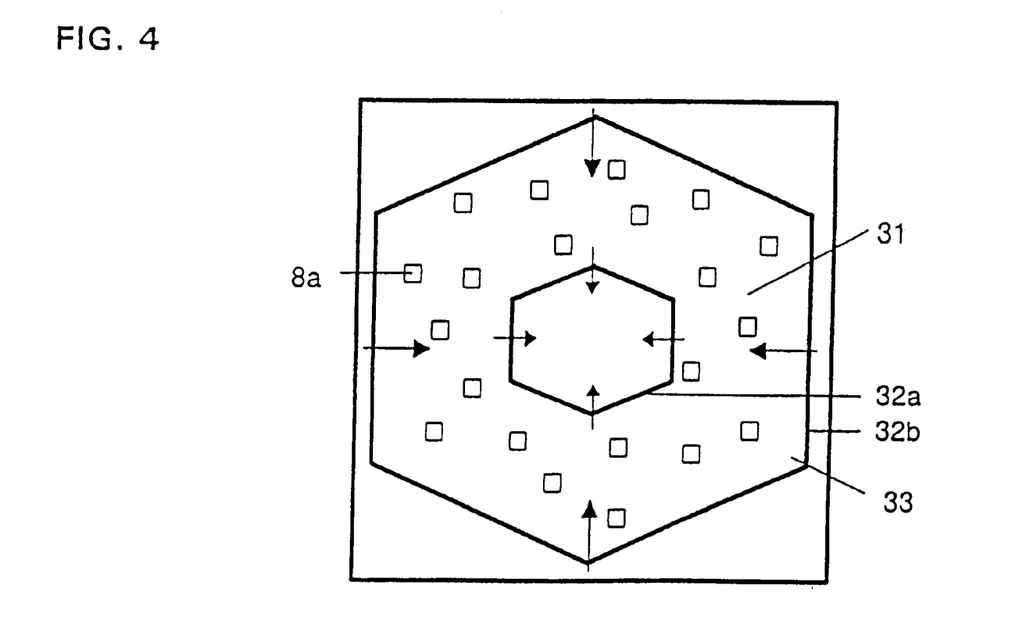
FIG. 4 shows in principle a horizontal cross-section of a polygonal embodiment of the device having a pair of annular Venetian-blind-like walls arranged essentially concentrically one inside the other and having supports; arrows indicate the preferred direction of flow of the air.

Embodiments having one or more annular reaction chambers 30, 31, regardless of triangular, polygonal or round cross-section, can in principle also be produced but in some cases have considerable disadvantages in terms of design and/or processing engineering. In the case of such plants, the two air-permeable Venetian-blind-like walls 29a, 29b, 32a, 32b of each pair are arranged essentially concentrically one inside the other, preferably concentrically about an imaginary, vertical longitudinal axis of the reactor vessel.

In the case of polygonal, annular reaction chambers 30, 31, the design disadvantages relate mainly to the cost of producing a plurality of short Venetian-blind-like walls instead of a few long ones and of producing curved blades in the case of round or elliptical reaction chambers. Process engineering disadvantages arise, inter alia, from the fact that the annular shape of the Venetian-blind-like wall arrangement always results in a cross-sectional reduction in the centripetal direction, which may lead to initially mentioned problems of the prior art. Moreover, poorly ventilated or unventilated dead zones may arise in the regions of the corners 33 of the polygonal, annular embodiments, which is in any case undesired.

In the preferred embodiment of the present invention having two pairs of plane-parallel Venetian-blind-like walls, a constant layer thickness of the two reaction chambers 15a, 15b is ensured without having to accept the disadvantage of a reduction in cross-section. It is in principle possible to lead the inlet air from the two outer air chambers 16a, 16b inward into one outlet air chamber, or vice versa. The centripetal air flow—i.e. directed from the outside inward—has however certain disadvantages, in particular with respect to the collection of warm exhaust air in the top space 17a of the exhaust air region 17 and with respect to the installtion of a heat exchanger and/or condensate collector in the exhaust air region 17.

In an embodiment which is likewise preferred, the vessel 13 tapers—primarily for receiving and discharging the treated material—downward in a funnel-like manner below the inner, horizontal vessel base 19 and opens into a closable outlet orifice 21. Between vessel base 19 and outlet orifice 21 there is an air chamber 20 which is connected to at least one air inlet pipe 22. The vessel base 19 is formed so as to be air-permeable in the region outside the outlet air zone 17, i.e. in the region of the air inlet and reaction chambers 15a, 15b present above, in particular in the form of a perforated base having perforated flaps 25 for emptying the vessel. The inlet air introduced into the chamber 20 below the vessel base 19 is forced to flow through the holes in the perforated base and penetrates into the reaction chambers 15a, 15b from below and via the air inlet regions 16a, 16b. The inflow from below has the particular advantage that the organic material in the base region, which frequently tends to agglomerate and is thus more poorly supplied with air, is also adequately ventilated and loosened.

The device according to the invention also contains, preferably in every embodiment, in the vessel base 19 in the region of the reaction chambers 15a, 15b, at least one closable orifice each, preferably at least two closable orifices each, in particular flaps 25 which on the one hand withstand the pressure applied by the content and on the other hand permit easy emptying of the bioreactor contents.

The device according to the present invention contains at least one air inlet pipe 22 per air inlet chamber and at least one air outlet pipe 23 per air outlet chamber, as well as fans, valves, flaps, etc. in an arrangement which makes it possible alternatively to force with pressure or to suck the air stream through the reaction chambers between the Venetian-blind-like wall or to both force with pressure and suck, i.e. to force with pressure on the air inlet side and to suck on the air outlet side. In many applications, a combination of exhaust fans installed on the air inlet and air outlet side, together with controllable valves, has proven most suitable for passing a very uniform air stream through the reaction chambers.

In an advantageous embodiment the air inlet pipe furthermore has a regulatable and/or controllable connection 28 to the air outlet pipe 23 and/or to at least one secondary air source. This is very advantageous in those cases where, for example, a desired proportion of the moisture-laden exhaust air is recirculated via the air inlet pipe, or where, for example, odor-bearing secondary air, for example from sheds, is to be deodorized. In this case, the device according to the invention simultaneously acts as a biofilter.

A particularly energy-saving embodiment of the device according to the invention also contains a heat exchanger (not shown in the Figures) which very rapidly transfer the waste heat from the exhaust air to the cooler inlet air. This combines two advantages: moisture-laden exhaust air which is warm or has a temperature up to 80° C. is cooled by the cooler inlet air and the moisture condenses and is either diverted into an existing sewer network or—if required, is at least partly reused for humidifying the inlet air. The inlet air is therefore preheated and thus supports biological degradation processes, which preferably take place under mesophilic or thermophilic conditions, in particular at up to about 80° C.

By controlling the fans and valves in the air inlet and air outlet line in a tailored manner, the flow through the reaction chamber toward the center of the vessel is generally forced. However, the direction of flow can be reversed if this is desired for certain intended uses.

The bioreactor is preferably filled above via a conveyor and distributing means which distributes the content uniformly in the reaction chamber via tightly closable orifices, in particular filling flaps 24.

In a further embodiment, the device according to the invention, having cyclically closed Venetian-blind-like walls or reaction chambers, contains a means for discharging fermented and/or dried material. In the simplest case, this is a mechanically operating discharger, depending on the type of device according to the invention, and is mounted on the base of the vessel (not shown in the Figures) and transports the treated material from the base of the vessel to the discharge orifice.

As in the case of most devices of this type, the device according to the invention, too, contains temperature, pH, humidity, $CO_2$ and/or $O_2$ probes, which are mounted at various points in the reaction chambers and/or air chambers and, in addition to controllable means, such as, for example, transport and conveyor means, inlet and outlet valves, flaps, fans, etc., also at least one regulating and/or control unit which makes it possible for the plant to operate fully automatically. In particular, this also makes it possible, in interaction with the various controllable elements, to optimally establish the intensity and rate of the fermentation and/or drying according to the type of content and if required to make corrections to the ventilation and/or dehumidification or humidification.

The invention is to be further illustrated below with reference to an Example. Of course, the Example serves only for additional information and does not constitute a restriction to a specific embodiment.

Example 1

Aerobic Partial Fermentation with Subsequent Drying

In the process described below, activated sludge from a communal wastewater treatment plant is converted by a rapid, aerobic partial fermentation into organo-mineral fertilizer and is rendered substantially germ-free (hygienized) at temperatures up to 80° C. and then dried in situ to a residual moisture content of less than 15% by weight. Consequently, the product has an unlimited shelf-life, is substantially free of unpleasant odors and—in addition to the mineral fraction—also always contains a valuable fraction of —in particular more slowly degradable—organic compounds.

However, it is possible and intended that, depending on requirements, another end product can be produced using the device according to the invention, for example a hygienized fertilizer or soil conditioner comprising nontoxic, digested sewage sludge. In the case of such products, the importance of the mineral fraction does of course predominate over the organic residual fraction. However, the device according to the invention can also be used to treat, i.e. at least hygienize and/or dry, water-containing residues having only a small organic fraction or no organic fraction or an organic fraction which is not biologically available, for example for subsequent final storage or incineration of industrial sludges or heavy metal-containing sewage sludges.

In the treatment of such organic residues or wastes, a substantially aerobic degradation of the biologically available matter is achieved essentially by prolonging the residence time of the material in the bioreactor, together with precisely tailored ventilation. If required, virtually any desired degree of degradation of the material can be achieved.

The organic material, in this case undigested, communal sewage sludge, is shaped into extrudate-like granules by means of a press and is transported via a conveyor belt to a distributing means which moves slowly back and forth over the two parallel reaction chambers 15a, 15b. The content is introduced loosely through the opened filling flaps 24 of the bioreactor vessel 13 into the reaction chambers 15a, 15b with the carriers 27 and the supports 26, in this case flat cylinders suspended from ropes and having a height of about 5 cm and a diameter of about 10 cm. In batchwise operation, the entire vessel 13 was emptied beforehand to remove treated material of the preceding batch, the elastically suspended rope 27 being vibrated by means of a vibrating device to assist the emptying. Small amounts of residual material which adhere to the blades 18 and to the supports 26 are by no means troublesome but make a positive contribution as seed material for accelerating the start of the microbiological degradation in the subsequent batch.

The blades 18 of the Venetian-blind-like walls 14a, 14b, 14c, 14d which form the two reaction chambers 15a, 15b are set at an angle of 50 degrees (relative to the horizontal) and thus effectively prevent material falling out or being forced out of the reaction chambers during the filling process. At this blade angle, the upper edges of the blades were at the same height as the lower edges of the respective blades above.

In the case of a semicontinuous mode of operation, the amount of fresh material added to the upper region of the reaction chambers 15a, 15b is always the same as the amount of fermented and dried material removed via the flaps 25 in the base 19 and via the base outlet orifice 21. However, in addition to blades adjustable segment by segment, special means are a considerable advantage or even essential for this mode of operation, such as, for example, horizontal elements 11a, 11b, which can substantially seal an upper section of a reaction chamber from the lower one by rotation or displacement. Such sealing of the top region toward the bottom can prevent undesired cooling and/or dehumidification of the material present below and at least considerably reduce undesired emergence of air with any unpleasant odors, for example during the refilling process.

As soon as the filling process is complete, the microbiological phase begins. The slide valves and flaps 24, 25 in vessel lid and base are closed. The content is present loosely in the reaction chambers 15a, 15b, between the Venetian-blind-like walls 14a, 14b or 14c, 14d and the supports 26. A specific inlet air quantity is now blown in via the inlet chamber 20 below the vessel base 19 by means of a fan installed on the air inlet side, flows through the perforation in the vessel base 19 and through the flaps 25 and—support supported by an exhaust fan installed on the outlet air side—is sucked both from below and from the side over the blades 18 into the reaction chambers 15a, 15b, through the loose bed of the organic material and further into the outlet air chamber 17. The air stream supplies oxygen to the microorganisms and transports heat, $CO_2$ and moisture out through the blades 18 toward outlet air chamber 17. This mixture of spent air and water vapor is extracted via a pipeline 23. It has proven advantageous, for further deodorization, subsequently to pass the exhaust air through a peat filter, which is likewise populated with microorganisms, and then optionally into a chimney. If required, however, at least a part-stream of this exhaust air can be recirculated to the inlet air stream in order thus to optimize humidity and temperature conditions.

The microorganisms break down the various organic substances, primarily sugar, fatty acids and protein compounds, into $CO_2$ and residues, heat being generated. This heat drives the moisture to the surface of the content, from where it is entrained by the air flowing past and is cooled in a heat exchanger in the central outlet air region 17 of the vessel 13 (not shown) by the colder air, for example entering at about 20–25°C., is for the most part condensed and is removed. Since only very small amounts of impurities, such as, for example, ammonia, are usually encountered in the condensate, the condensate, which has a pH of about 7.8 to 8, can be discharged into the sewer system without problems. The remaining air/water vapor mixture goes into the chimney, as described above.

The required amount of air is determined from the measured values of a few temperature, $CO_2$, and humidity probes in the interior of the reactor and is controlled by means of a controllable equilibration valve in the air inlet pipe 22 and optionally by changing the fan power and/or adjusting the blade angle of the blades 18. Depending on the type of content, the process can moreover be supported and/or prolonged by at least partial recirculation of the still moist or already condensed exhaust air via the connecting pipe 28.

The waste heat produced by the microorganisms continuously increases the temperature of the content, and the air flowing through also slowly heats up to 80° C. The absorptivity of water vapor thus further increases, a factor which can be advantageously utilized in a subsequent drying phase. If, owing to too low a content of utilizable organic matter, the heating with microorganisms alone is insufficient for reaching and maintaining the hygienization temperature of about 70 to 80° C., the inlet air may have to be additionally heated in spite of preheating by the heat exchanger installed on the outlet air side.

As soon as the biological degradation process approaches its end, the temperature in the reaction chamber begins to drop. Depending on the type of content, the microbiological phase, i.e. the partial fermentation, may be complete after only a few hours, for example 10 to 15 hours, or only after a few days. In the subsequent drying process, which essentially smoothly follows the declining biological process, drying air is sucked through the treated content by means of an exhaust fan. Either fresh air is used for this purpose or secondary air, such as, for example, odor-laden exhaust air from a digestion tower, a production hall or an animal shed, admixed in any desired ratio or completely in place of fresh air, is used. The organic odor substances in the secondary air are removed by the biofilter action of the microorganisms in reaction chambers 15a, 15b and the secondary air is deodorized in this manner.

After a drying phase of at least about 5 to 10 hours, the treated, in this case fermented and hygienized, content reaches a final moisture content of less than 15% and thus has an unlimited shelf-life. As soon as the desired final moisture content has been reached, the heating of the inlet air is switched off and a cooling phase lasting for about one hour is initiated. For this purpose, unheated inlet air is sucked through the reaction chambers and the content is thus cooled to ambient temperature. Thereafter, the last fans are switched off, the lid and base flaps are opened, the vessel 13 is emptied with support from said vibrating means and a further amount of fresh content is introduced into the reaction chambers 15a, 15b. The process can begin again.

In the pilot plant, it was found that all unpleasantly smelling components of the organic starting material were converted and the end product caused no odor annoyance. The process described here was implemented substantially fully automatically by means of a simple process control device and was monitored by a process control system which was likewise simple.

What is claimed is:

1. A device (1) for the aerobic treatment, conditioning and/or drying of moist, essentially solid or pasty material, based on a vessel (2, 13) having a divided interior in which supports (8a, 8b, 8c, 8d, 26) are arranged, the interior being divided by at least one pair of air-permeable walls in such a way that those sides of the walls (insides) of such a pair which face one another form a reaction chamber (4, 15a, 15b, 30, 31) while the sides facing away from one another (outsides) form at least one air inlet chamber (5, 16a, 16b) and at least one outlet air chamber (6, 17), and additional means, selected from transport and conveyor means, filling and discharge devices, air pipes, fans, valves, flaps, sliding valves, control and regulating means, wherein a) the walls essentially consist of a Venetian-blind-like construction (3a, 3b, 14a, 14b, 14c, 14d, 29a, 29b, 32a, 32b) in which the blades (10, 10a, 10b, 18) are arranged with predetermined blade angles, distances, lengths and/or widths and b) the supports (8a, 8b, 8c, 8d, 26) are spatially arranged and are in staggered array inside the reaction chamber (4, 15a, 15b, 30, 31) in such a way that they reduce the pressure applied to the moisture-laden material and thus make it possible to achieve a loosened bed.

2. The device as claimed in claim 1, wherein the air-permeable walls (3a, 3b, 14a, 14b, 14c, 14d, 29a, 29b, 32a, 32b) have a height of about 1 to about 10 m, and the distance between the walls of a pair is about 50 to about 250 cm.

3. The device as claimed in claim 1, wherein the blades (10, 10a, 10b, 18) point with their lower edges toward the reaction chamber (4, 15a, 15b, 30, 31) and with their upper edges away from the reaction chamber, have a length of about 0.5 to about 10 m, a width of about 5 to about 30 cm and a thickness of about 0.2 to about 0.8 cm and are arranged at a blade angle of about 40 to about 70 degrees relative to the horizontal.

4. The device as claimed in claim 1, wherein the blades (10, 10a, 10b, 18) are arranged at a vertical distance of about 5 to about 20 cm, one above the other so that the upper edge of each blade is at at least the same height as the lower edge of the respective blade lying directly above.

5. The device as claimed in claim 1, wherein the blades (10, 10a, 10b, 18) are adjustable in their blade angles.

6. The device as claimed in claim 1, wherein the blade construction (3a, 3b, 14a, 14b, 14c, 14d, 29a, 29b, 32a, 32b) contains, in the vertical and/or horizontal direction, at least two, segments which can be changed jointly and/or independently of one another with respect to the angle of the blades.

7. The device as claimed in claim 1, wherein grids or nets having a mesh size of about 0.2 to about 6 cm are additionally mounted between the blades (10, 10a, 10b, 18).

8. The device as claimed in claim 1, wherein the supports (8a, 8b, 8c, 8d, 26) occupy about 0.5 to not more than about 10% of the volume of the vessel.

9. The device as claimed in claim 1, wherein at least a part of the supports (8a, 8b, 8c, 8d, 26) is mounted on carriers (9, 27) and, together with these, occupies about 0.5 to not more than about 10% of the volume of the vessel.

10. The device as claimed in claim 9, wherein the carriers (9, 27) are ropes, rods or chains and the supports (8a, 8b, 8c, 8d, 26) are symmetrically or asymmetrically shaped members.

11. The device as claimed in claim 1, wherein at least a part of the supports (8a, 8b, 8c, 8d, 26) is in the form of vertically arranged spirals or screws (8b), optionally with a spiral path interrupted in segments.

12. The device as claimed in claim 1, wherein at least a part of the supports (8a, 8b, 8c, 8d, 26) is in the form of a Venetian-blind-like construction (8d) having adjustable blades, this blade construction (8d) comprising at least one Venetian-blind-like wall which extend in the vertical direction.

13. The device as claimed in claim 1, wherein the supports (8a, 8b, 8c, 8d, 26) have a horizontal dimension of about 5 to about 35 cm, and are arranged at a vertical distance of about 10 to about 100 cm, at a lateral distance of about 20 to about 80 cm from one another.

14. The device as claimed in claim 13, wherein the spirals or screws (8b) have a spiral path about 5 to about 35 cm wide, a diameter of about 10 to about 80 cm and a pitch of about 10 to about 100 cm.

15. The device as claimed in claim 1, wherein the interior of the vessel (2, 13) is divided by at least one pair of linear air-permeable walls (3, 3b, 14a, 14b, 14c, 14d), and the reaction chambers (4, 15a, 15b) have an essentially rectangular horizontal cross-section.

16. The device as claimed in claim 15, which contains, inside the reaction chambers, rotational or displaceable horizontal elements (11a, 11b) which, in at least one rotational or displacement position, divide the reaction chamber into two or more sections one on top of the other.

17. The device as claimed in claim 16, wherein the horizontal elements (11a, 11b,) are tubular elements of elliptical, triangular or polygonal cross-section and are arranged in one or more horizontal planes so that they are essentially parallel to one another, are rotatable about their longitudinal axis and extend over the total or almost the total length of a reaction chamber (4, 15a, 15b).

18. The device as claimed in claim 1, wherein the vessel (2, 13) contains, below the vessel base (19), an air chamber (20) which tapers in a funnel-like manner and opens into the one or more air inlet pipes (22) and wherein the vessel base (19) is formed to be air-permeable in the region outside the one or more air outlet chambers (6, 17).

19. The device as claimed in claim 1, wherein the vessel base (19) has at least one closable orifice, in the region of the one or more reaction chambers (4, 15a, 15b, 30, 31).

20. The device as claimed in claim 9, wherein the supports (8a, 8b, 8c, 8d, 26) and/or carriers (9, 27) are displaceably arranged and optionally are connected to a vibrating means.

21. The device as claimed in claim 1, wherein the vessel (2, 13) is equipped with at least one air inlet pipe (22) and at least one air outlet pipe (23), at least one of which is connected to a heat exchanger, the air inlet pipe (22) also having a regulatable and/or controllable connection (28) to the air outlet pipe (23) and/or to a secondary air source.

22. The device as claimed in claim 1, wherein the air-permeable walls (29a, 29b, 32a, 32b) of each pair are closed in an annular manner and are arranged essentially concentrically one inside the other and have a triangular, polygonal or circular cross-section, or possibly the pairs being arranged concentrically around an imaginary vertical longitudinal axis of the vessel.

23. A process for the aerobic treatment, conditioning and/or drying of moist, substantially solid or paste-like material, using a device comprising a vessel (2, 13) having a divided interior in which supports (8a, 8b, 8c, 8d, 26) are arranged, the interior being divided by at least one pair of air-permeable walls in such a way that those sides of the walls (insides) of such a pair which face one another form a reaction chamber (4, 15a, 15b, 30, 31) while the sides facing away from one another (outsides) form at least one air inlet chamber (5, 16a, 16b) and at least one outlet air chamber (6, 17), and additional means, selected from transport and conveyor means, filling and discharge devices, air pipes, fans, valves, flaps, sliding valves, control and regulating means, wherein the walls essentially consist of a Venetian-blind-like construction (3a, 3b, 14a, 14b, 14c, 14d, 29a, 29b, 32a, 32b) in which the blades (10, 10a,10b, 18) are arranged with predetermined blade angles, distances, lengths and/or widths and the supports (8a, 8b, 8c, 8d, 26) are spatially arranged and are in staggered array inside the reaction chamber (4, 15a, 15b, 30, 31) in such a way that they reduce the pressure applied to the moisture-laden material and thus make it possible to achieve a loosened bed, wherein the ventilation and venting of the reaction chambers (4, 15a, 15b, 30, 31) is controlled by changing the fan power and/or adjusting the valves in the air inlet and air outlet pipes (22, 23) and/or adjusting the angle of the blades (10, 10a, 10b, 18).

24. The process as claimed in claim 23, using a device wherein the supports (8a, 8b, 8c, 8d, 26) occupy about 0.5 to not more than about 10%, of the volume of the vessel wherein the angle of the blades (10, 10a, 10b, 18) is set differently from segment to segment.

25. The process as claimed in claim 23, using a device which contains, inside the reaction chambers, rotational or displaceable horizontal elements (11a, 11b) which, in at least one rotational or displacement position, divide the reaction chamber into two or more, sections one on top of the other which horizontal elements (11a, 11b) arranged in at least two planes, wherein two sections of a reaction chamber (4, 15a, 15b) which lie one on top of the other are connected to one another by rotating or displacing the horizontal elements of a plane, while the horizontal elements of a second plane keep the subsequent sections separated.

26. The process as claimed in claim 23, wherein material bridges which are formed between adjacent supports are broken by moving the blades (10, 10a, 10b, 18), supports (8a, 8b, 8c, 8d, 26) and/or carriers (9, 27) and further transport of the treated material inside the device and/or discharge of said material from the device is thus assisted.

27. The device as claimed in claim 1, wherein the material is at least partly organic.

28. The device as claimed in claim 2, wherein the air-permeable walls have a height of about 4 to about 6 m.

29. The device according to claim 2, wherein the distance between the walls of a pair is about 60 to about 120 cm.

30. The device as claimed in claim 3, wherein the blade angle is 50 degrees relative to the horizontal.

31. The device as claimed in claim 4, wherein the blades are arranged at a vertical distance of about 10 cm.

32. The device as claimed in claim 6, wherein the blade construction contains three to ten segments.

33. The device as claimed in claim 7, wherein the mesh size is about 0.5 to about 3 cm.

34. The device as claimed in claim 8, wherein the supports occupy about 1 to about 6% of the volume of the vessel.

35. The device as claimed in claim 9, wherein the supports and the carriers together occupy about 1 to 6% of the volume of the vessel.

36. The device according to claim 10, wherein the supports are selected from cubes, cylinders, cones, disks, plates, spheres and spiral elements.

37. The device according to claim 12, comprising two to fifteen Venetian-blind-like walls.

38. The device according to claim 12, wherein the Venetian-blind-like walls extend at least over three quarters of the height of the reaction chamber.

39. The device according to claim 12, wherein the Venetian-blind-like walls contain segments which can be changed jointly and/or independently of one another with respect to the angle of the blades.

40. The device according to claim 13, wherein the horizontal dimension is about 10 to about 20 cm.

41. The device according to claim 13, wherein the vertical distance is about 20 to about 50 cm.

42. The device according to claim 13, wherein the lateral distance is about 30 to about 50 cm.

43. The device according to claim 15, wherein the interior of the vessel is divided into an even number of pairs of the same size and geometry.

44. The device according to claim 16, wherein the sections are at least approximately closed.

45. The device according to claim 19, wherein the closable orifice comprises at least one flat orifice.

46. The process according to claim 23, wherein the material is at least partly organic.

47. The process according to claim 24, wherein the supports occupy about 1 to about 6% of the volume of the vessel.

48. The process according to claim 25, wherein the reaction chamber is divided into at least approximately closed sections.

* * * * *